United States Patent [19]

Razumovsky et al.

[11] 3,911,000

[45] Oct. 7, 1975

[54] METHOD FOR PREPARING DICARBOXYLIC ACIDS

[76] Inventors: Stanislav Dmitrievich Razumovsky, Vorobievskoe shosse, 11, kv. 68; Gennady Efremovich Zaikov, ulitsa Novatorov, 40, korpus 12, kv. 46, both of Moscow; Dmitry Vasilievich Mushenko, ulitsa Krasnaya, 40, kv. 12, Leningrad; Vladimir Leonidovich Klimenko, Fontanka, 66, kv. 29, Leningrad; Viktor Karlovich Tsyskovsky, Kanal Griboedova, 22, kv. 6, Leningrad; Jury Nikolaevich Juriev, ulitsa Kurskaya, 31, kv. 14, Leningrad, all of U.S.S.R.

[22] Filed: Mar. 23, 1972

[21] Appl. No.: 237,500

[52] U.S. Cl. ............................................. 260/533 C
[51] Int. Cl.² .................... C07C 55/14; C07C 51/18
[58] Field of Search ................................ 260/533 D

[56] References Cited

UNITED STATES PATENTS

| | | | |
|---|---|---|---|
| 3,059,028 | 10/1962 | Perry | 260/533 D |
| 3,280,183 | 10/1966 | Maggiolo | 260/533 D |
| 3,441,604 | 4/1969 | Boylis et al. | 260/533 D |
| 3,637,721 | 1/1972 | Pappas et al. | 260/533 D X |

FOREIGN PATENTS OR APPLICATIONS

| | | | |
|---|---|---|---|
| 720,423 | 10/1965 | Canada | 260/533 D |

OTHER PUBLICATIONS

Durland et al. J. A. C. S. Vol. 61, 1939, pp. 429–433.

*Primary Examiner*—Anton H. Sutto
*Assistant Examiner*—Richard D. Kelly
*Attorney, Agent, or Firm*—Waters, Schwartz & Nissen

[57] ABSTRACT

A method for preparing aliphatic dicarboxylic acids by oxidation of saturated cyclic hydrocarbons with an ozone-containing gas, for example with a mixture of ozone and air, the ozone content of the gaseous mixture being from 1 to 8 percent by volume.

14 Claims, No Drawings

METHOD FOR PREPARING DICARBOXYLIC ACIDS

This invention relates to organic synthesis, and more particularly it relates to the improvement of methods for preparing dicarboxylic acids.

Dicarboxylic acids are important intermediates in the synthesis of various plastics, foams, plasticizers, etc.

Acids having the formula carbon atoms have most valuable properties, but the methods for their synthesis are either complicated or require highly expensive raw materials. At the present time the processes most frequently employed in the chemical industry are synthesis of sebacic acid from ricinoleic acid by fusing it with alkali and preparation of azelaic acid from oleic acid by ozonization. Under development at the present time are methods based on oligomerization of butadiene in the presence of sodium with subsequent saturation of the mixture with carbon dioxide, electrolysis of the half ester of adipic acid, and some other methods. However, all these methods are only used for the manufacture of sebacic acid that cannot meet the growing requirements of the chemical industry.

A more general method for the preparation of dicarboxylic acids is the oxidation of cyclic hydrocarbons in which, depending on a particular hydrocarbon, an acid can be produced having this or that number of carbon atoms in the chain. The oxydation is carried out at elevated temperature (120°–150°C) usually in two steps. At the first step oxydation is effected with air to prepare mainly cyclohexanone which is then oxidized to an acid, the oxidizer in the second step of the process being usually nitric acid. Employment of nitric acid complicates significantly the process flowsheet and involves certain additional operations such as regeneration of $HNO_3$, purification of water, recovery of nitrogen oxides from waste gases, etc., these additional operations being sometimes even more complicated than the main process. Furthermore, the quality of thus produced acids is deteriorated on account of formation of small quantities of nitrogen-containing compounds. Attempts have been made to utilize air in both steps of oxidation but they proved inefficient since the yield of dicarboxylic acid was low (73–75 percent by weight) and their quantity was inadequate.

The object of this invention is to rule out nitric acid from the process by selecting another oxidizer.

This object has been attained in a one-step process of oxidation of cyclic hydrocarbons to dicarboxylic acids with an ozone-containing gas. The method according to the invention consists in passing a jet of an ozone-containing gas, which may be a mixture of gases ($N_2 + O_3$, $O_2 + O_3$ or $N_2 + O_2 + O_3$ and others) through a solution of a cyclic hydrocarbon in an organic solvent stable to the action of ozone of through a melt of a cyclic hydrocarbon heated to the melting point (or somewhat above it) of the starting cyclic hydrocarbon. The ozone content of the mixture should be from 1 to 8 percent by volume.

As the gas is bubbled through the reaction mixture, ozone is absorbed in the hydrocarbon mass and oxidizes the hydrocarbon to a dicarboxylic acid, which is no longer oxidized due to its higher stability toward ozone. The oxidation is better in the presence of salts of metals having variable valence, for example copper, nickel, chromium, manganese or cobalt. Salts of organic or inorganic acids can also be used (acetates, naphthenates, phosphates, including salts formed during the process of oxidation). The quantity of these salts should be 0.2 – 0.4 percent by weight.

Solutions of salts should preferably be used, but suspensions are also practicable. The catalytic action of metal salts consists in decomposition of peroxides which are formed in the process of oxidation.

Isolation of the acid can be effected by any of the known methods: by separation of crystals on a filter, by transfer into sodium salts or by extraction with suitable solvents.

The yield of dicarboxylic acids with reference to the reacted hydrocarbon is 94–96 percent, the optimum conversion in a single pass being 20–30 percent. Thus prepared dicarboxylic acids are distinguished for their high quality, practical absence of nitrogen-containing compounds, unsaturated and other compounds which deteriorate the properties and the apperance of the finished product. The rate of ozone consumption per one ton of the acids 0.1-1.3 ton, depending on the properties of the starting cyclic hydrocarbon and the process conditions. The process is characterized by simplicity, high yields of the main product, the absence of effluents and noxious discharge into the atmosphere at the stage of synthesis.

For a better understanding of the proposed method the following examples of practical embodiment of the invention are given by way of illustration.

EXAMPLE 1

82 G of cyclohexane were placed into a reaction vessel equipped with a sparger and an ozone-oxygen mixture (5 percent of $O_3$) was bubbled at a rate of 0.2 liter per minute for 30 hours. The reaction temperature was 10°C. Precipitated crystals of adipic acid (8 g) were separated, volatile products distilled from the reaction mixture, crude acids which remained in the mixture after distillation and the adipic acid crystals were dissolved in water and recrystallized. The yield of adipic acid was 27 g, m.p. 149°C, the acid number 810 mg KOH/g, bromine number 0.

EXAMPLE 2

168 G of cyclododecane were placed into a vessel having a porous bottom, heated to a temperature of 65°C and in the presence of 0.2 percent manganese acetate an ozone-oxygen mixture was passed through the molten product for eight hours. The ozone content of the gaseous mixture was 5 percent. The rate of the gas mixture passage was 2 liter/min. The reaction mixture was then treated with soda. The sodium salts of dicarboxylic acids were separated, decomposed with sulfuric acid, and 1,10-decanedicarboxylic acid was recrystallized from alcohol. The yield of the acid was 73 g (94 percent of theory), the extent of oxidation was 30 percent, the melting point 127°C, the acid number 480 mg KOH/g, bromine number 0.

EXAMPLE 3

A continuous plane consisting of a reaction vessel equipped with a sparger and an extraction column, having the total capacity (with respect to the hydocrabon load) of 1 liter was used in the experiment. 10 kg of cyclododecane were oxidized in a continuous process at a temperature from 85° to 95°C in the presence of manganese acetate (0.4 percent) with an ozone-air mixture (3.5 percent of ozone) bubbled at a rate of 5 litres per minute. The process continued for 250 hours. On termination of the reaction, the amount of non-oxidized hydrocarbon was 970 g, crude acid 12.4 kg, the contents of the trap amounted to 30 g. After recrystallization from alcohol the yield of the acid was 11.6 kg (94 percent of theory), m.p. 127°C, acid number 480 mg KOH/g, bromine number 0.

EXAMPLE 4

112 G of cyclooctone were ozonized as described in example 2, with an ozone-air mixture (1.5 per cent of ozone) for 10 hours at a temperature of 40°C, after which the acid was extracted with an aqueous solution of methyl alcohol (1:1). The alcohol was then distilled, and suberic acid was purified by recrystallization. The amount of conversion was 20 percent, the yield of the acid was 35 g (95 of percent of theory), m.p. 144°C, acid number 640 K mg KOH/g, bromine number 0.

EXAMPLE 5

82 G of cyclohexane were dissolved in 200 ml of nitromethane, heated to a temperature of 40°C in the presence of 0.3 percent salt of manganese, acid, prepared by oxidation of cyclohexane, as in Example 1 (0.3 percent with reference to manganese). An ozone-oxygen mixture (4.1 percent of ozone) was blown through the reaction mixture for 16 hours at a rate of one liter/min. The acid was isolated in conditions described in Example 2. The yield of adipic acid was 67 g (95 percent of theory), m.p., 149.6°C.

We claim:

1. A method for preparing an unsubstituted aliphatic α,ω-dicarboxylic acid having 6 to 12 carbon atoms comprising oxidizing an unsubstituted saturated cyclic hydrocarbon having 6 to 12 carbon atoms in the ring with ozone in an ozone-containing gas containing 1 to 8 percent by volume of ozone in the presence of a salt of a metal having variable valence selected from the group consisting of copper, nickel, chromium, manganese and cobalt.

2. A method as claimed in claim 1, wherein a mixture of ozone with oxygen is used as the ozone-containing gas.

3. A method as claimed in claim 1, wherein a mixture of ozone with air is used as the ozone-containing gas.

4. A method as claimed in claim 1, wherein a mixture of ozone with nitrogen, is used as the ozone-containing gas.

5. A method as claimed in claim 1, wherein the cyclic hydrocarbon is oxidized in a solution of an organic solvent stable toward the action of ozone.

6. A method as claimed in claim 5, wherein nitromethane is the organic solvent.

7. A method as claimed in claim 1, wherein the cyclic hydrocarbon is oxidized at a temperature equal to or somewhat above the melting point of the starting cyclic hydrocarbon.

8. A method as claimed in claim 1, wherein the salt is taken in an amount from 0.2 to 0.4 per cent by weight with reference to the metal.

9. A method according to claim 1 wherein the metal having variable valence is manganese.

10. A method according to claim 1 wherein the reaction is carried out in the absence of a solvent.

11. A method according to claim 9 wherein the reaction is carried out in the absence of a solvent.

12. A method according to claim 9 wherein the salt is taken in an amount from 0.2 to 0.4 percent by weight with reference to the manganese.

13. A method according to claim 1 wherein the ozone-containing gas is blow through the hydrocarbon in molten form at a temperature within the range of 10° to 95°C.

14. A method according to claim 13 wherein the acid products are continuously removed from the reaction zone.

\* \* \* \* \*